(12) United States Patent
Davis et al.

(10) Patent No.: US 11,629,631 B2
(45) Date of Patent: Apr. 18, 2023

(54) DEAERATION VALVE

(71) Applicant: ILLINOIS TOOL WORKS INC., Glenview, IL (US)

(72) Inventors: Joseph Davis, Archbold, OH (US); Nathan Osmun, Glenview, IL (US); Christopher Carns, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 207 days.

(21) Appl. No.: 17/142,910

(22) Filed: Jan. 6, 2021

(65) Prior Publication Data

US 2021/0239033 A1    Aug. 5, 2021

Related U.S. Application Data

(60) Provisional application No. 62/968,553, filed on Jan. 31, 2020.

(51) Int. Cl.
*F16K 5/06* (2006.01)
*F01P 7/14* (2006.01)
*F16K 24/06* (2006.01)

(52) U.S. Cl.
CPC .............. *F01P 7/14* (2013.01); *F16K 5/0605* (2013.01); *F16K 24/06* (2013.01); *F01P 2007/146* (2013.01); *F16K 2200/202* (2021.08); *F16K 2200/401* (2021.08)

(58) Field of Classification Search
CPC .... F16K 5/12; F16K 5/0605; F16K 2200/202; F16K 2200/401; F01P 11/028; Y10T 137/8803
USPC ..................................................... 137/614.17
See application file for complete search history.

(56) References Cited

U.S. PATENT DOCUMENTS

| | | | | |
|---|---|---|---|---|
| 4,846,221 A | * | 7/1989 | Kanemaru | F16K 5/0605 251/288 |
| 5,305,790 A | * | 4/1994 | Giacomini | F16K 47/023 137/542 |
| 5,456,298 A | * | 10/1995 | Tennis | G01F 11/22 141/156 |
| 5,586,579 A | * | 12/1996 | Diehl | F16K 5/0605 137/614.17 |

* cited by examiner

*Primary Examiner* — Michael R Reid
(74) *Attorney, Agent, or Firm* — Quarles & Brady LLP

(57) ABSTRACT

A deaeration valve includes a housing and a ball in fluid communication with housing. The ball can include a body, a seat defining a bleed passage therein, and a deaeration pin slidably disposed within the bleed passage. Further, the deaeration pin may include a head, a retention feature, and a shaft positioned between the head and the retention feature.

20 Claims, 12 Drawing Sheets

DEAERATION VALVE

CROSS REFERENCE TO RELATED APPLICATIONS

This application is based on, claims priority to, and incorporates herein by reference in its entirety U.S. Provisional Application No. 62/968,553, filed on Jan. 31, 2020.

BACKGROUND

1. Field of the Disclosure

Embodiments of the present disclosure generally relate to fluid control components and, more particularly, to a deaeration valve.

2. Description of the Background

In recent years, valves have been developed to control and/or divert fluids. For example, automobiles include coolant systems that include one or more valves. The valves control and/or divert coolant fluid flow among an engine and/or a radiator of the automobile. Certain known valves include a ball sealingly mounted in a housing. When the ball rotates in the housing, the ball controls fluid flow through the housing.

However, these known valves may permit air to become trapped within the coolant system, such as air that is introduced into the coolant system when the coolant system is opened for servicing. Therefore, a need exists for a valve that controls fluid flow during operation of the vehicle and further allows air to escape the coolant system selectively.

SUMMARY

In one aspect, a valve includes a housing and a ball in fluid communication with housing. The ball can include a body, a seat defining a bleed passage therein, and a deaeration pin slidably disposed within the bleed passage. Further, the deaeration pin may include a head, a retention feature, and a shaft positioned between the head and the retention feature.

In some embodiments, the head of the deaeration pin defines a flat end surface. In some embodiments, the head of the deaeration pin may define a concave end surface. In some examples, the retention feature may include a first barb, a second barb, and a valley positioned between the first and second barbs and partially extending along the shaft. The bleed passage includes a first section having a greater diameter than a third section, and a second section having a gradually narrowing diameter between the first section and the third section. In some embodiments, the head may define a sealing surface that is spaced apart from the second section when the deaeration pin is in an open position. The retention feature may be spaced apart from the seat when the deaeration pin is in a closed position.

In some embodiments, a valve may include a housing and a ball rotatably positioned within the housing. The ball can include a body having a seat protruding inwardly from the body into a cavity. The seat defines a bleed passage therein. A deaeration pin can be selectively positioned between a closed position and an open position within the bleed passage. The deaeration pin includes a head, a sealing surface, a shaft, and a retention feature. In some embodiments, the deaeration pin can slide within the bleed passage to selectively open or close a bleed inlet. Further, the seat may define a first inner surface, a second inner surface that gradually narrows in diameter, and a third inner surface having a diameter that is smaller than a diameter of the first inner surface.

In some embodiments, the sealing surface can contact the second inner surface in a closed position. The retention feature contacts the seat in an open position. The retention feature may include a first barb, a second barb, and a valley. In some embodiments, the sealing surface may gradually narrow in diameter. In some embodiments, the sealing surface is coved. Further, the deaeration pin slides into an open position by a gravitational force or the deaeration pin slides into a closed position by a pumping force.

In some embodiments, a valve may include a housing defining an inlet and an outlet and a ball in fluid communication with the inlet and the outlet. In this example, the ball can include a body, a pivot post, a seat defining a bleed passage, and a deaeration pin slidably disposed within the bleed passage. The deaeration pin may include a head attached to a shaft and a retention feature attached to the shaft. The head can further define a sealing surface thereon. The seat may include a first inner surface, a second inner surface, and a third inner surface. In related aspects, the first inner surface may have a greater diameter than a diameter of the third inner surface, and the second inner surface can have a gradually narrowing diameter between the first inner surface and the third inner surface. In some examples, the head of the deaeration pin may be disposed adjacent to the first inner surface and the sealing surface of the deaeration pin can be configured to engage the second inner surface in a closed position. The retention feature of the deaeration pin may be configured to engage the seat in an open position.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

Figure 1:
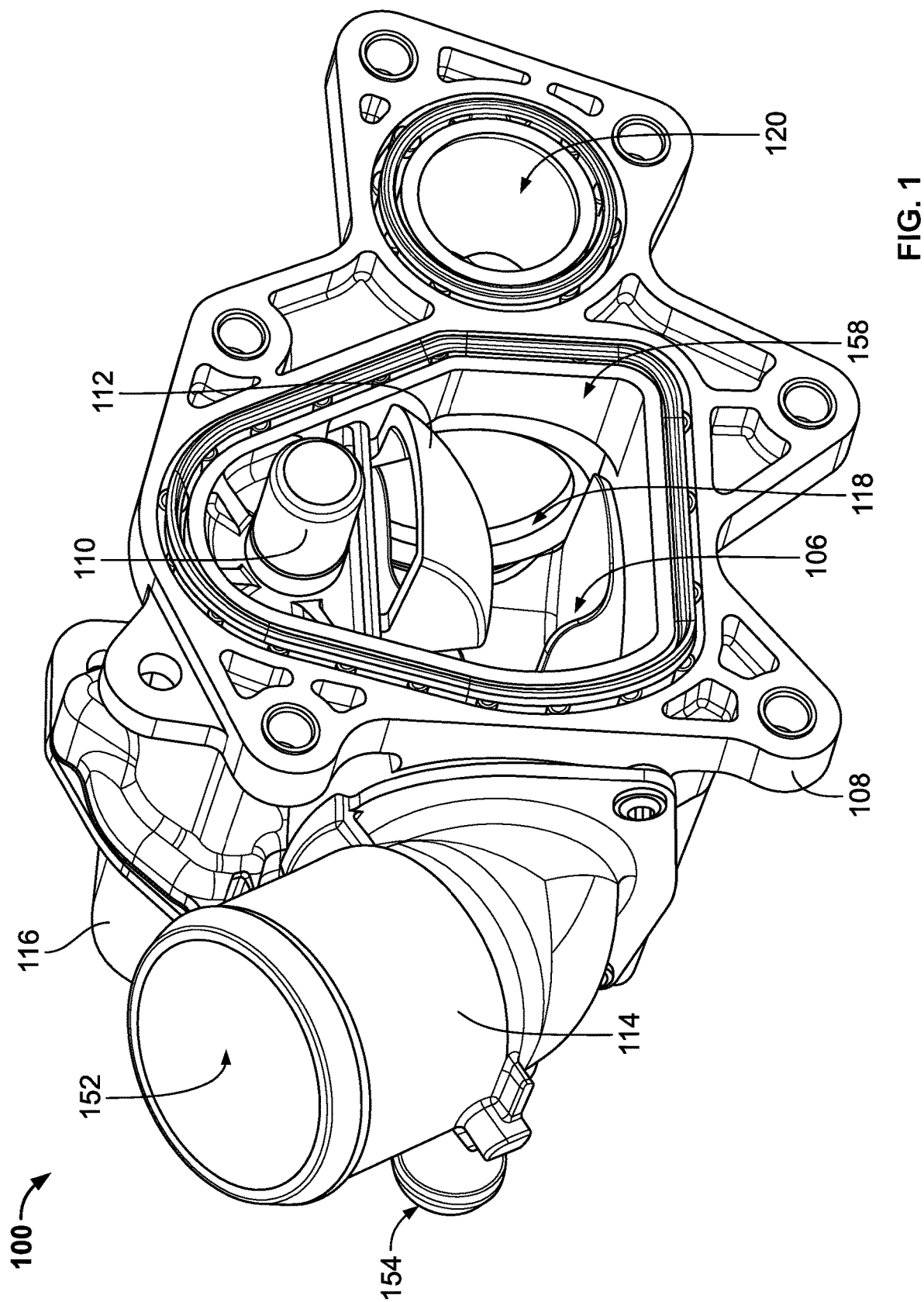
FIG. 1 is an isometric view of a first example deaeration valve according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Embodiments of the present disclosure provide for a valve that has features to facilitate controlling fluid flow in a coolant system of a vehicle during operation of the vehicle and that allows air to escape the coolant system.

Figure 2:
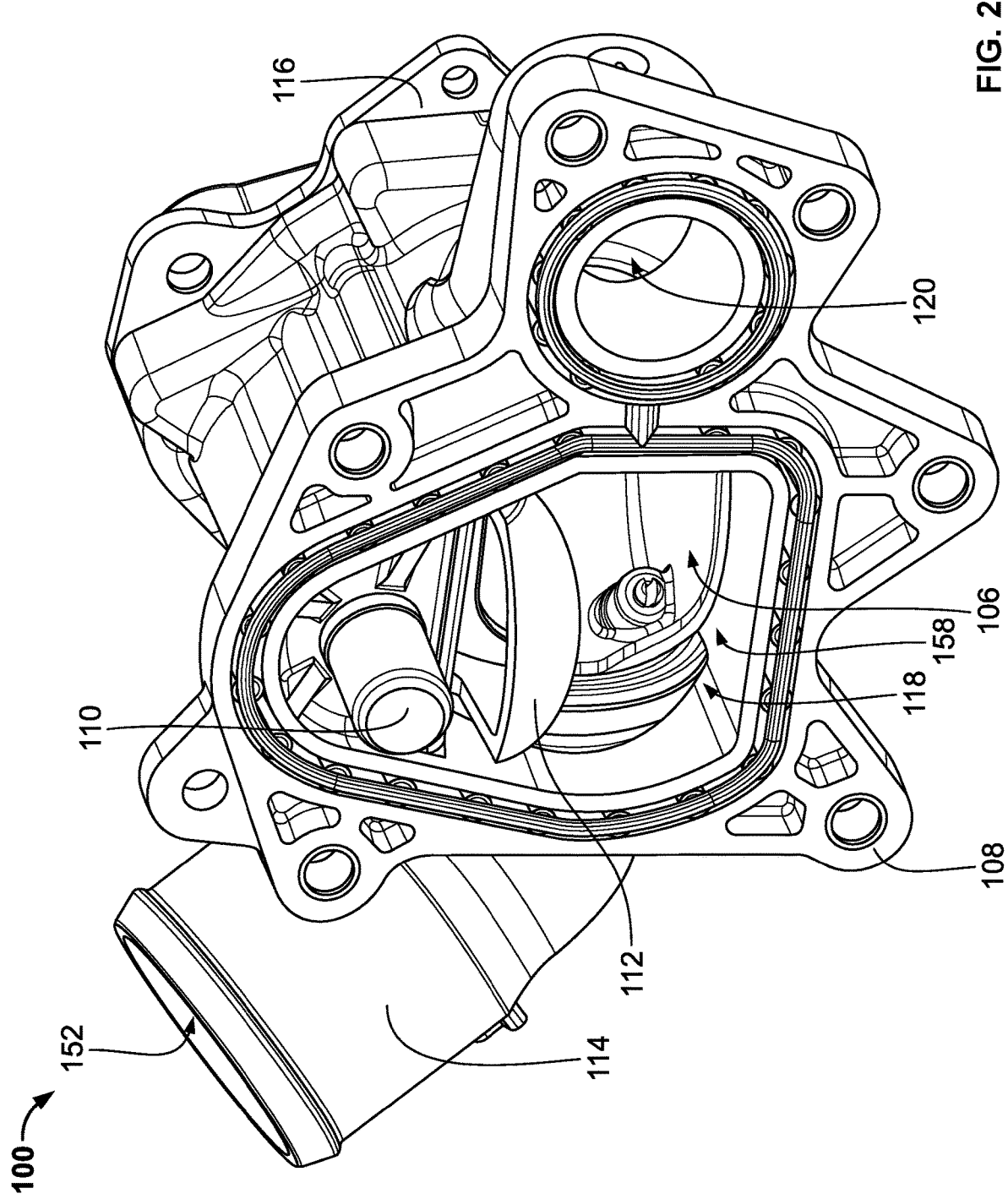
FIG. 2 is a second isometric view of the deaeration valve of FIG. 1.
Figure 3:
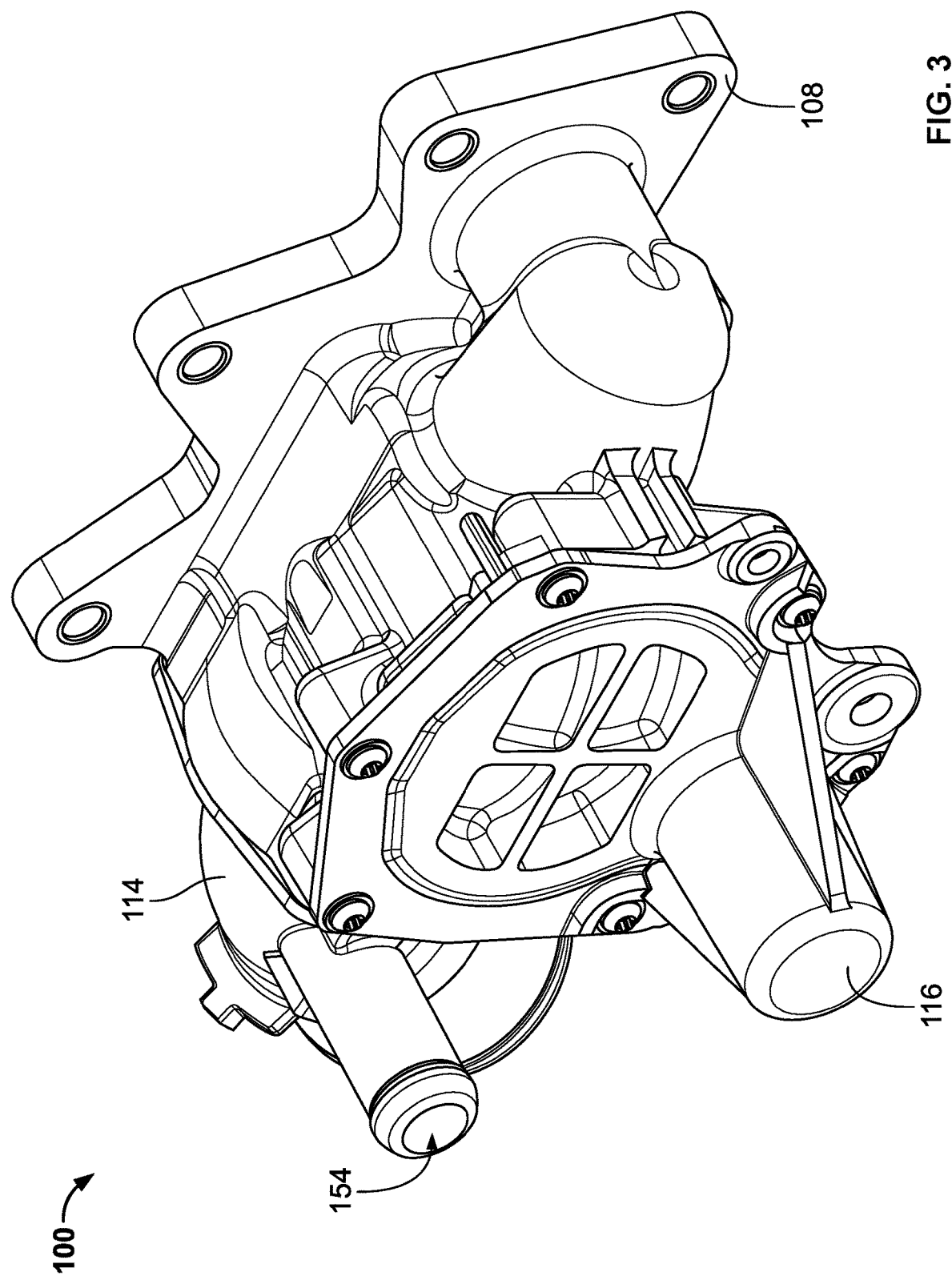
FIG. 3 is a third isometric view of the deaeration valve of FIG. 1.

A deaeration valve 100, according to an embodiment of the present disclosure is depicted in FIGS. 1-4. With reference to FIGS. 1 and 2, the deaeration valve 100 includes a bleeder assembly 106, a housing 108, a wax motor 110, a diverter 112, a first heat exchanger connector 114, and a cover 116. The housing 108 defines a cavity 118 and a bypass inlet 120.

Figure 4:
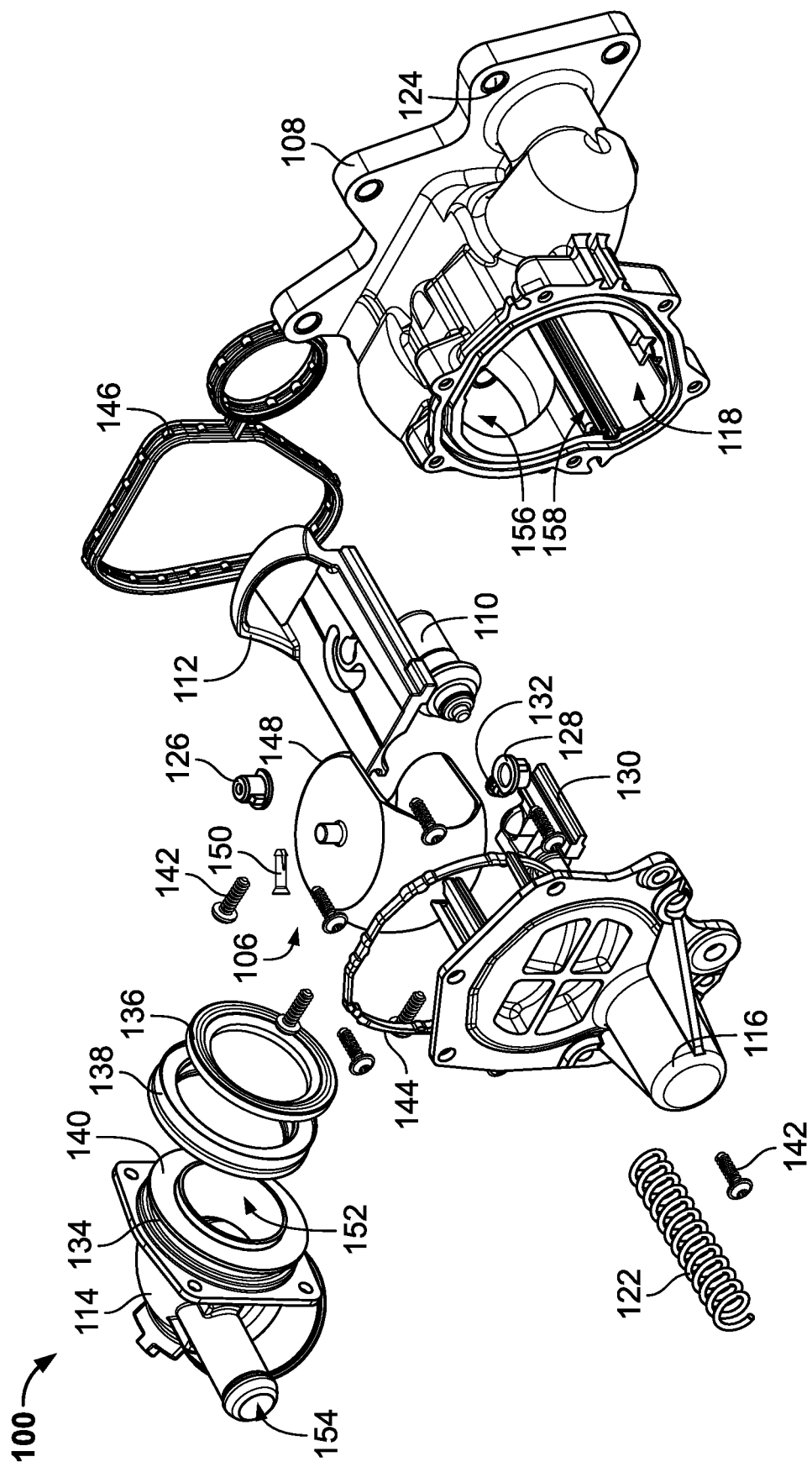
FIG. 4 is an exploded view of the deaeration valve of FIG. 1.
Figure 5:
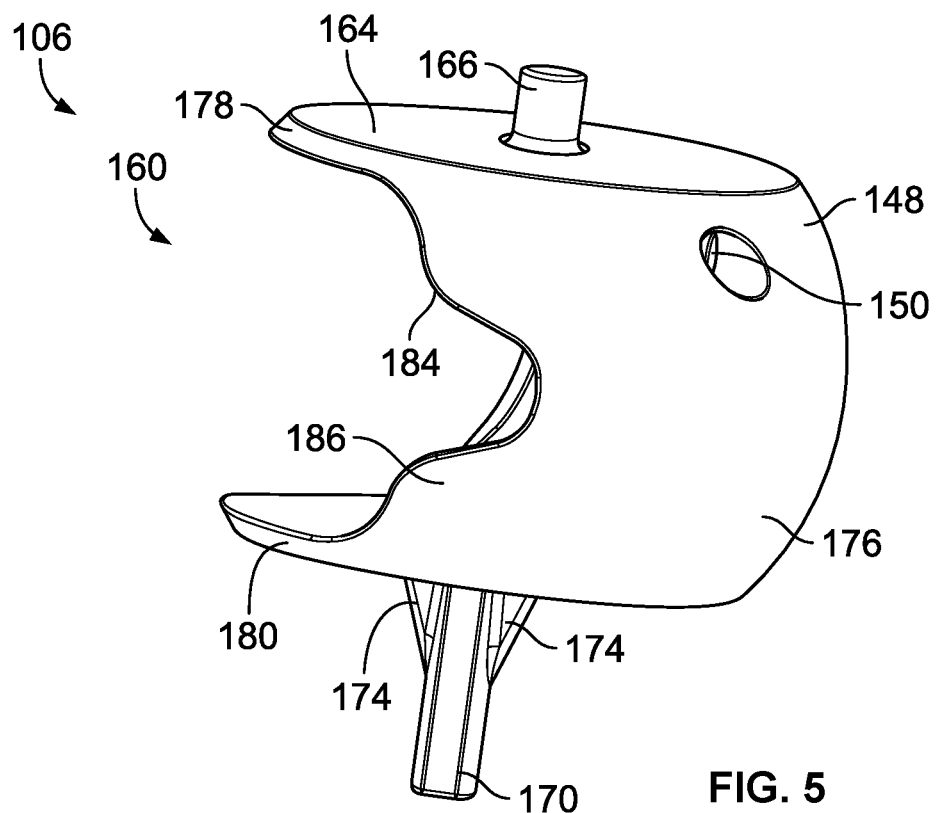
FIG. 5 is an isometric view of a bleeder assembly of the deaeration valve of FIG. 1 in an open state.

With reference to FIG. 4, the deaeration valve 100 further includes a spring 122, a plurality of bushings 124, a first bearing 126, a second bearing 128, a plunger 130, a receiver cap 132, a first O-ring 134, a ball seal 136, a support ring 138, a profile seal assembly 140, a plurality of screws 142, a first gasket 144, and a second gasket 146. The bleeder assembly 106 of the deaeration valve 100 includes a ball 148 and a first example deaeration pin 150.

With reference to FIG. 4, the first heat exchanger connector 114 defines a first coolant inlet 152 and a second coolant inlet 154. The housing 108 further defines an opening 156 and a coolant outlet 158. Various components of the deaeration valve 100 are similar to and further described in U.S. patent application Ser. No. 17/011,498, filed by Illinois Tool Works, Inc. on Sep. 3, 2020, which is herein incorporated by reference in its entirety.

Figure 6:
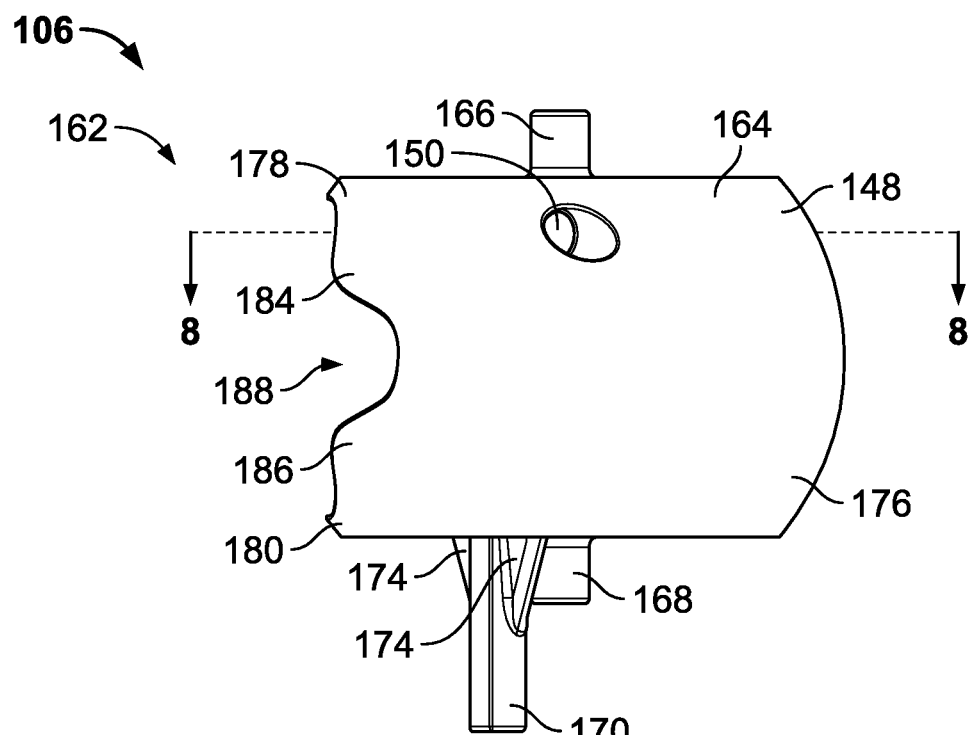
FIG. 6 is a side view of the bleeder assembly of FIG. 5 in a closed state.
Figure 7:
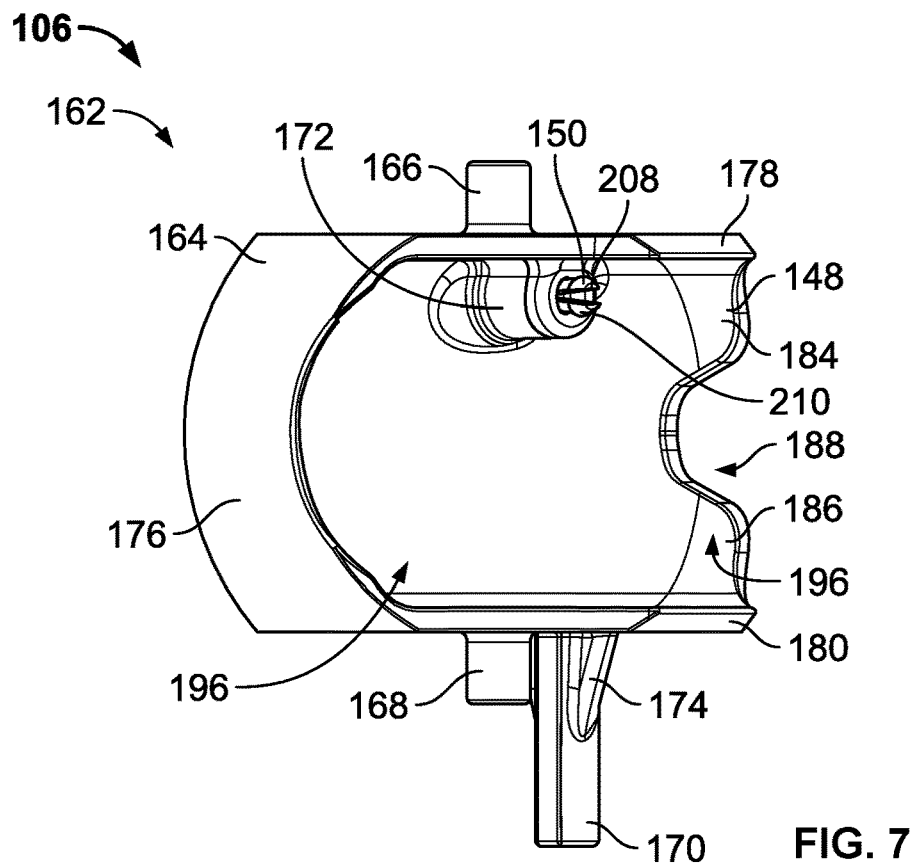
FIG. 7 is a rear view of the bleeder assembly of FIG. 5 in the closed state.
Figure 8:
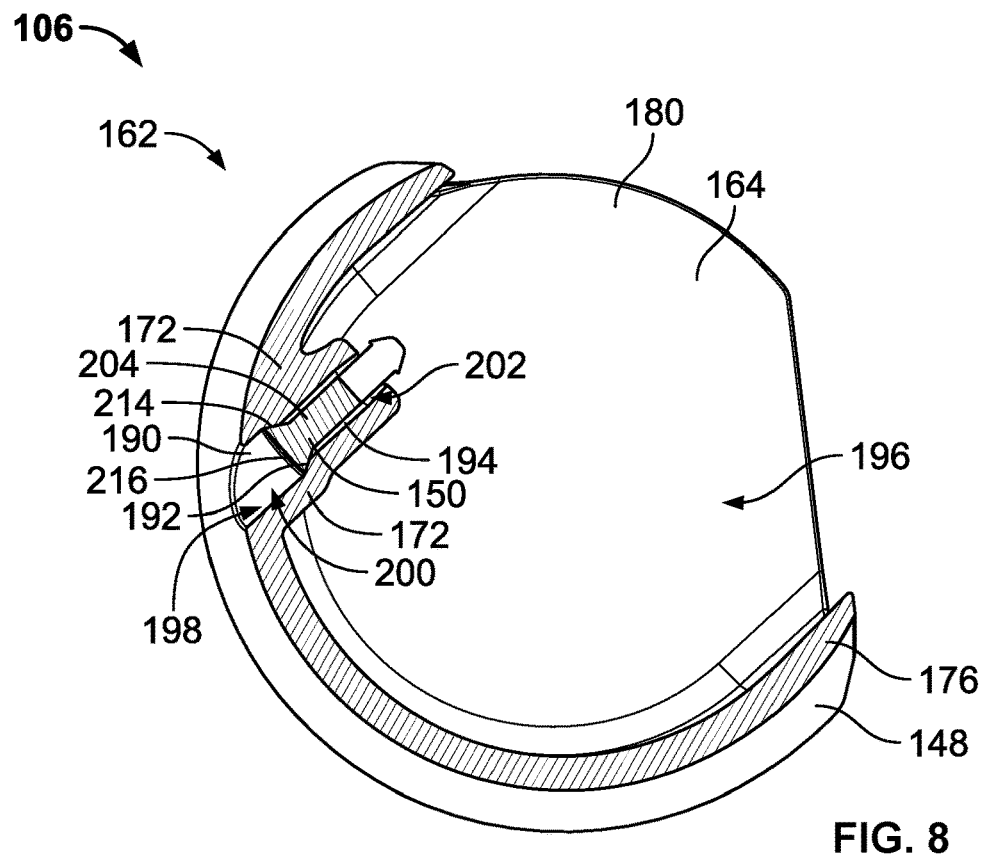
FIG. 8 is a cross-sectional view of the bleeder assembly of FIG. 5 taken along line 8-8 of FIG. 6.
Figure 9:
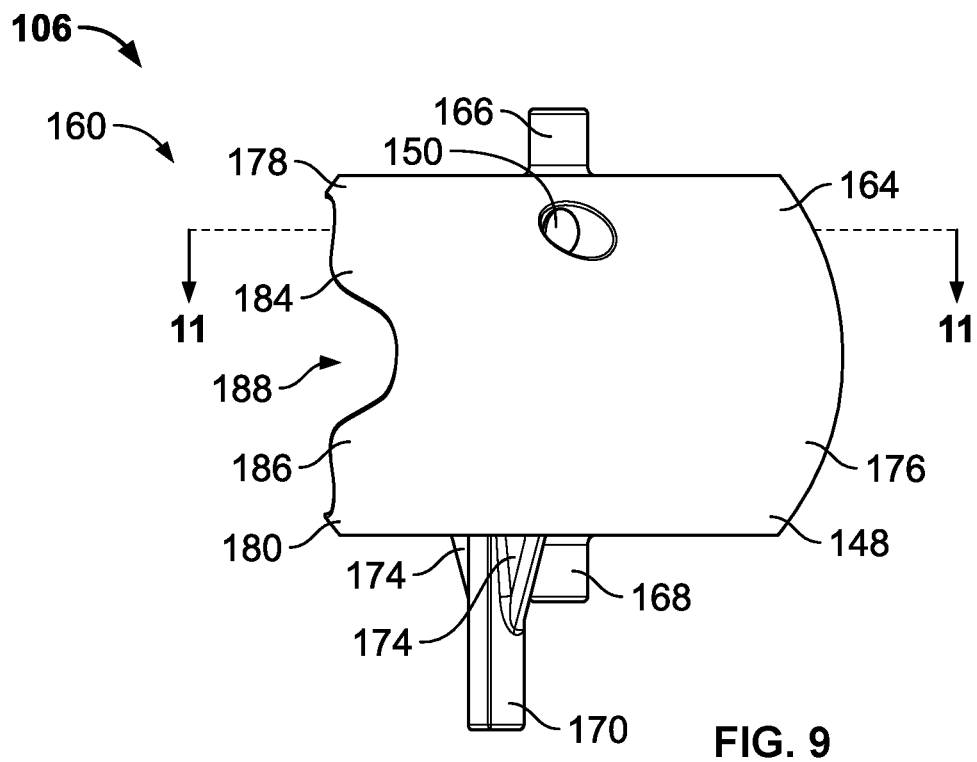
FIG. 9 is a side view of the bleeder assembly of FIG. 5 in an open state.

With reference to FIGS. 5 and 9-11, the bleeder assembly 106 is shown in an open state 160. With reference to FIGS. 6, 7, and 8, the bleeder assembly 106 is shown in a closed state 162. The ball 148 is rotatably positioned within the housing 108. Further, the ball 148 is in fluid communication with at least the first coolant inlet 152, the second coolant inlet 154, and the coolant outlet 158.

Figure 12:
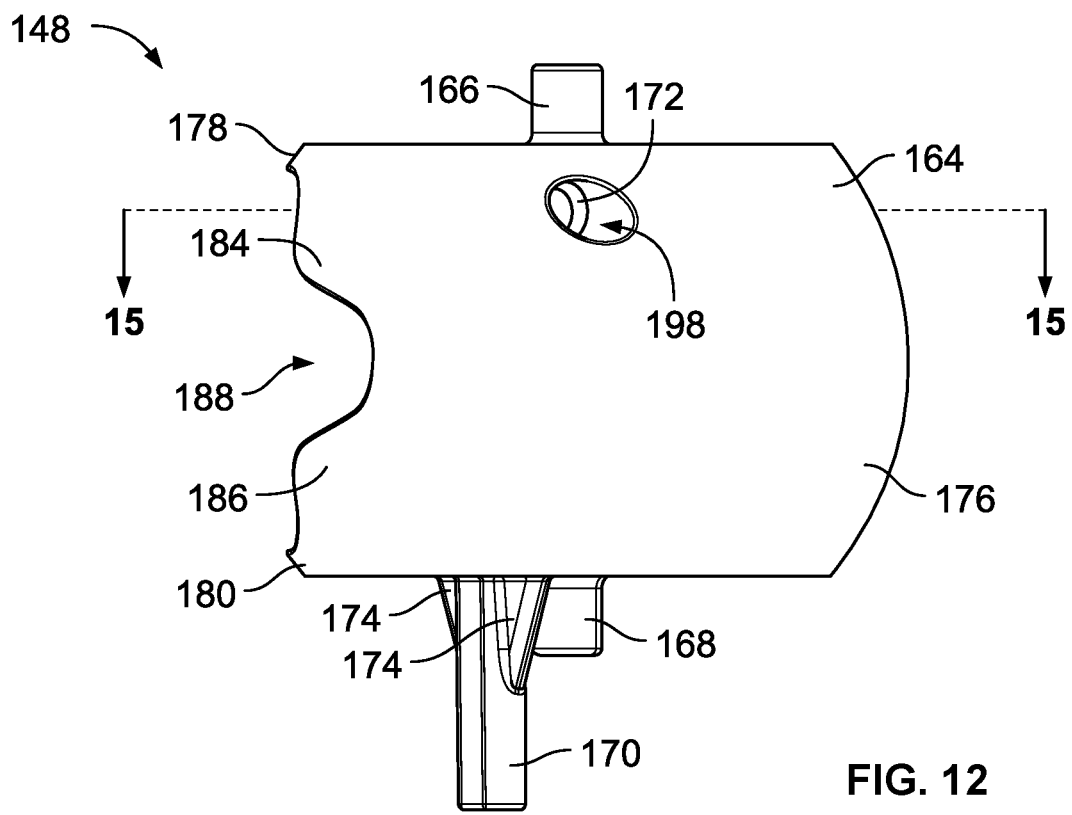
FIG. 12 is a side view of a ball of the bleeder assembly of FIG. 5.
Figure 13:
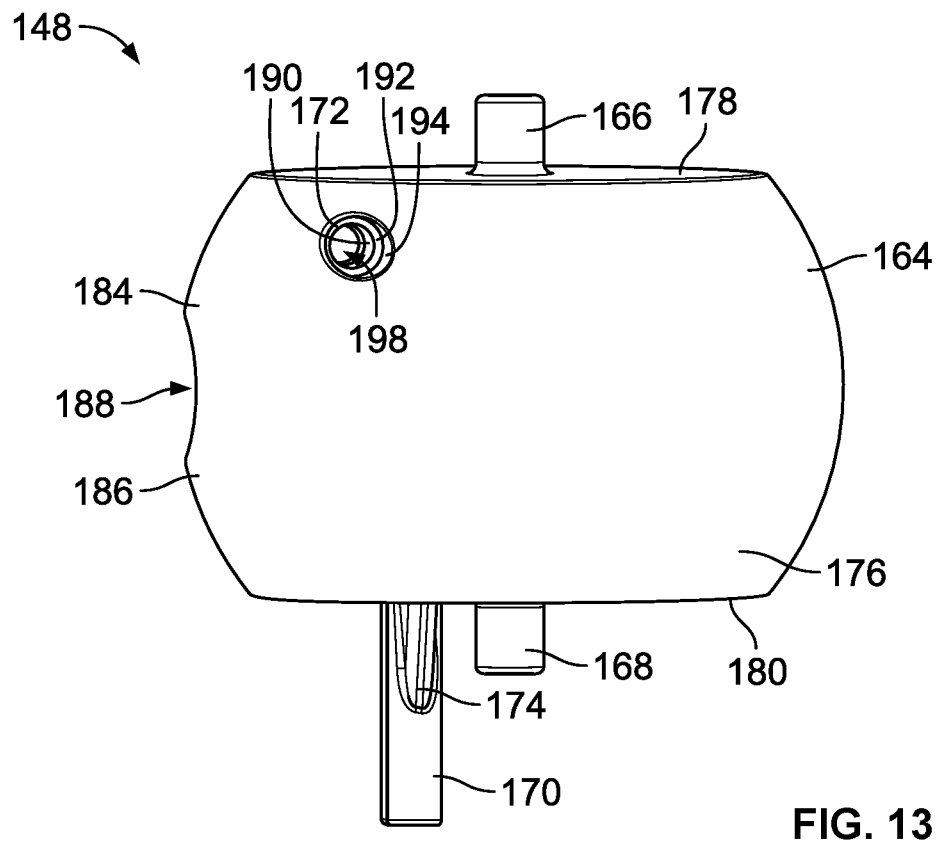
FIG. 13 is an isometric view of the ball of FIG. 5.
Figure 14:
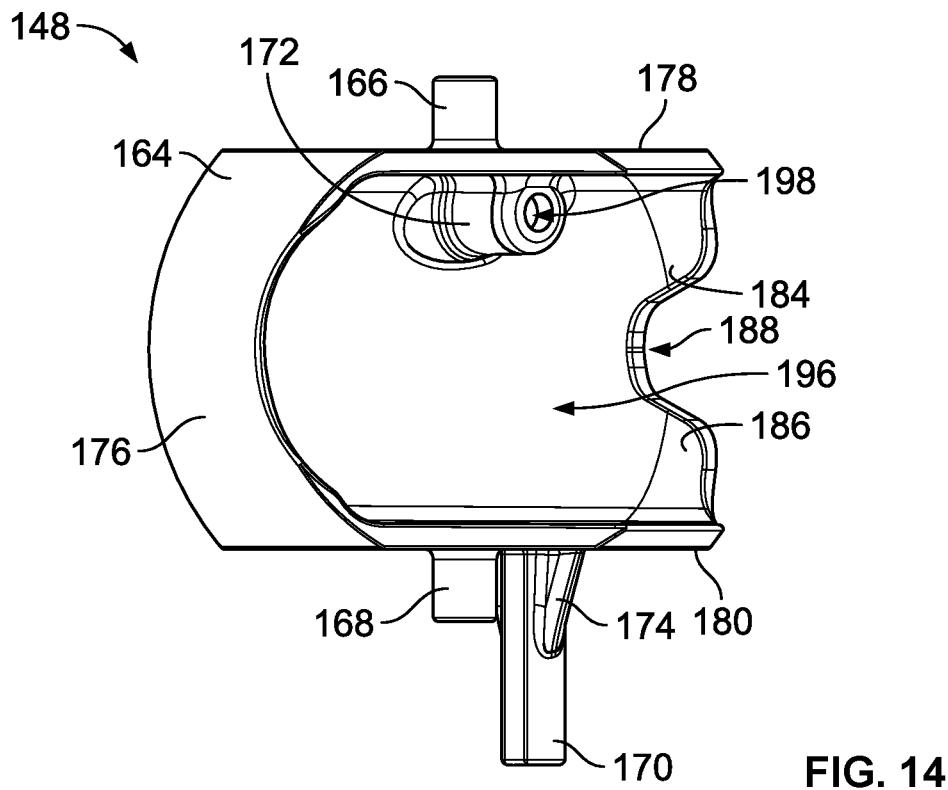
FIG. 14 is a rear view of the ball of FIG. 5.

With reference to FIGS. 12, 13, and 14, the ball 148 includes a body 164, a first pivot post 166, a second pivot post 168, an actuating post 170, a seat 172, and supporting ribs 174. The body 164 includes a sealing wall 176 that is configured to engage or interact with the ball seal 136, an upper wall 178, a lower wall 180, an upper lobe 184, a lower lobe 186, and a metering gap 188. The body 164 is partially spherical between the upper wall 178 and the lower wall 180. The metering gap 188 is sized and shaped to regulate the flow of coolant passing through the sealing wall 176 of the ball 148 and, ultimately, through the deaeration valve 100, thereby impacting the coolant flow rate.

In some embodiments, the metering gap 188 may be shallow, which would result in a rapid increase in the release of coolant through the sealing wall 176 of the ball 148 and a larger pressure differential as measured between the coolant inlet 152 and the coolant outlet 158. In other embodiments, the metering gap 188 may be deep, which would result in a slow, gradual increase in the release of coolant through the sealing wall 176 of the ball 148 and a smaller pressure differential between the coolant inlet 152 and the coolant outlet 158. In addition, it is contemplated that the thickness of each of the sealing wall 176, the upper wall 178, the lower wall 180, the upper lobe 184, and the lower lobe 186 may be varied. For example, as appreciated from FIG. 10, the thickness of the sealing wall 176 varies between the upper wall 178 and the lower wall 180.

Figure 15:
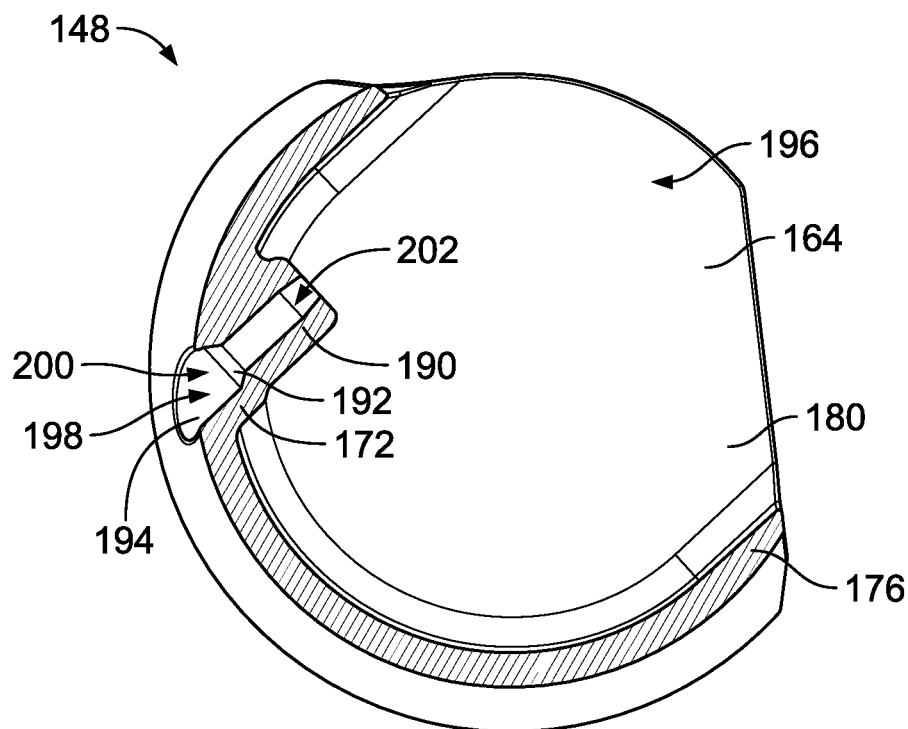
FIG. 15 is cross-section view of the ball of FIG. 5 taken along line 15-15 of FIG. 12.

With reference to FIGS. 13 and 15, the seat 172 has a first inner surface 190, a second inner surface 192, and a third inner surface 194. The first inner surface 190 and the third inner surface 194 are generally cylindrical. The first inner surface 190 is greater in diameter than the third inner surface 194. The second inner surface 192 gradually narrows in diameter. In some embodiments, the second inner surface 192 is partially hemispherical. In other embodiments, the second inner surface 192 is coved (e.g., radiused, trumpet-shaped, concave, etc.). In still other embodiments, the second inner surface 192 is partially conical. The second inner surface 192 is positioned between the first inner surface 190 and the third inner surface 194, and provides a transition between the first inner surface 190 and the third inner surface 194.

With reference to FIGS. 14 and 15, the body 164 defines a cavity 196 between the upper wall 178 and the lower wall 180, and adjacent to the sealing wall 176. The cavity 196 is partially spherical. With reference to FIG. 15, the seat 172 protrudes inwardly from the sealing wall 176 of the body 164 into the cavity 196. The seat 172 further defines a bleed passage 198, a bleed inlet 200, and a bleed outlet 202.

Figure 16:
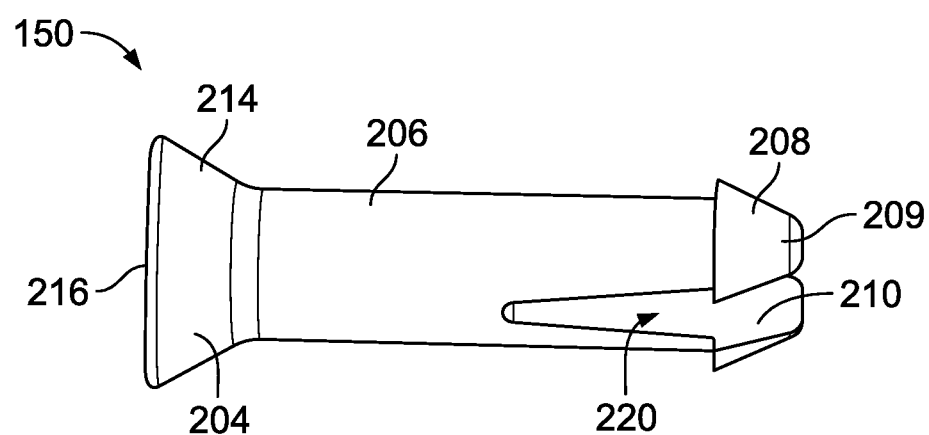
FIG. 16 is a side view of a deaeration pin of the bleeder assembly of FIG. 5.
Figure 17:
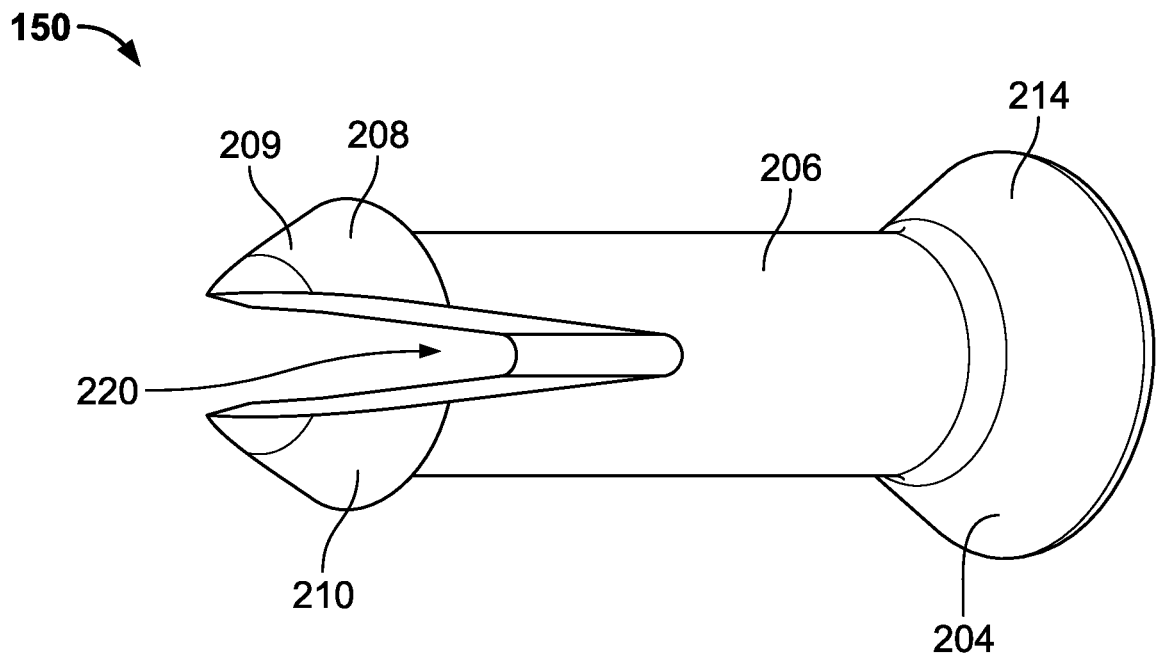
FIG. 17 is an isometric view of the deaeration pin of FIG. 16.
Figure 18:
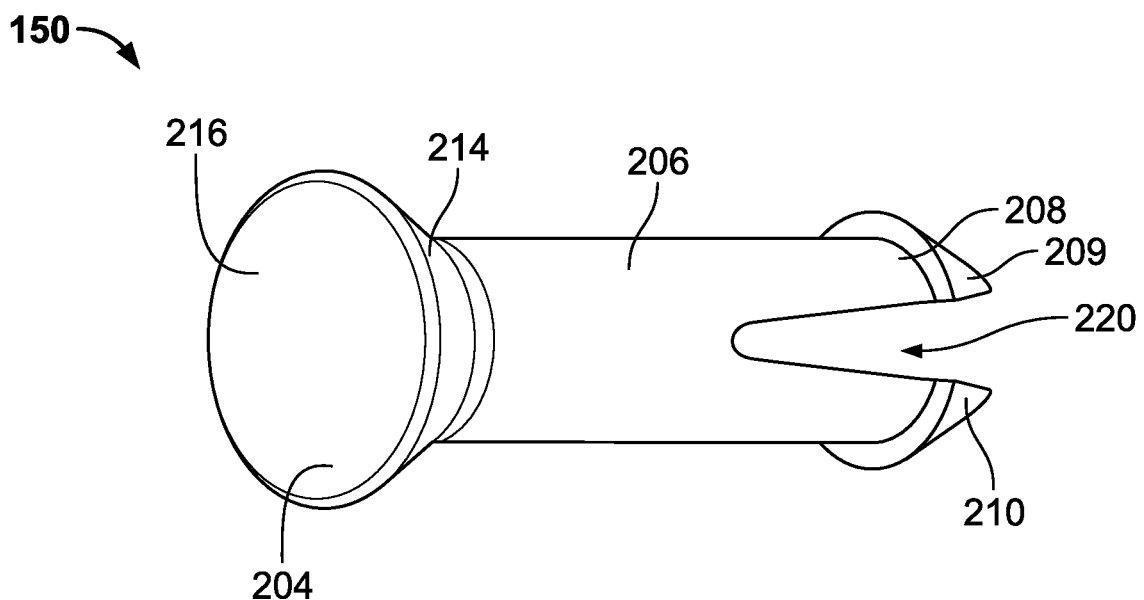
FIG. 18 is another isometric view of the deaeration pin of FIG. 16.

With reference to FIGS. 16, 17, and 18, the first example deaeration pin 150 includes a sealing head 204, a shaft 206, and a retention feature 208. The shaft 206 is positioned between the sealing head 204 and the retention feature 208. In some embodiments, the sealing head 204 is attached to the shaft 206, or the sealing head 204 may be integrally formed with the shaft 206. Similarly, the retention feature 208 may be attached to the shaft 206 or integrally formed with the shaft 206. The retention feature 208 includes a first barb 209 and a second barb 210. With reference to FIGS. 16 and 18, the sealing head 204 has a sealing surface 214 and an end surface 216. The sealing surface 214 gradually narrows in diameter. In some embodiments, the sealing surface 214 is coved (e.g., internally radiused and/or inwardly rounded). In other embodiments, the sealing surface 214 is partially conical. The end surface 216 can be generally flat. In some embodiments, the first barb 209 and the second barb 210 define a valley 220 therebetween, such that the valley 220 extends partially along the shaft 206 toward the sealing head 204.

Figure 10:
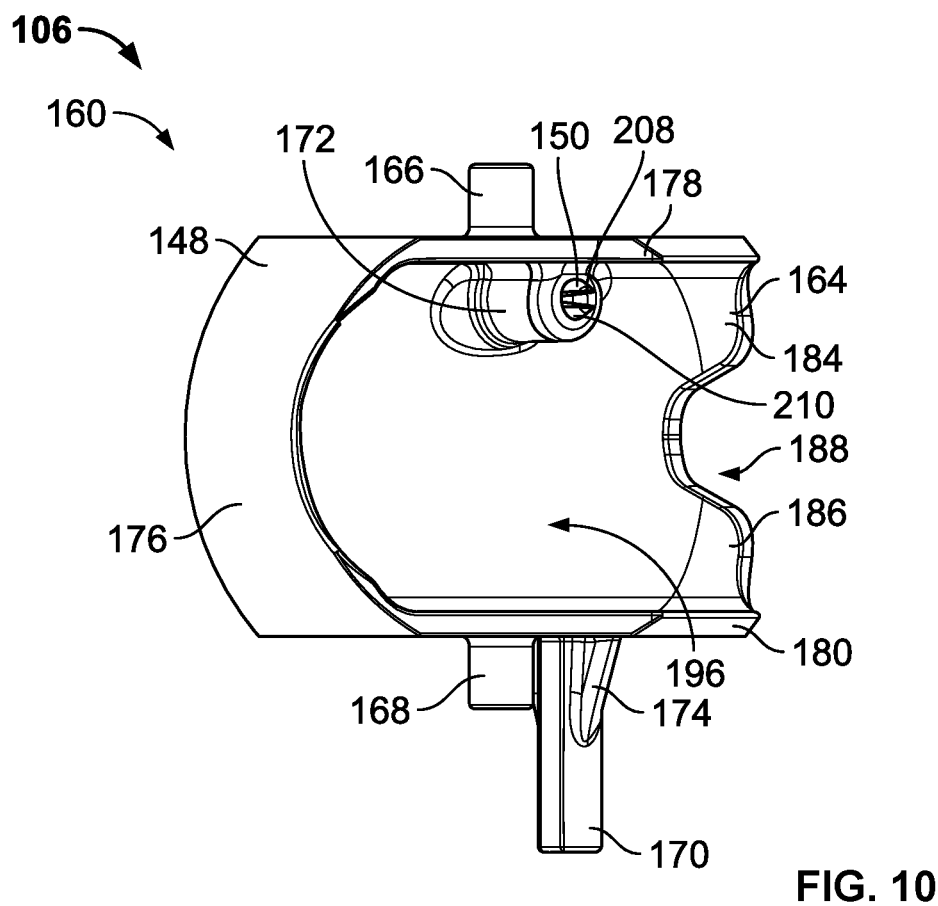
FIG. 10 is a rear view of the bleeder assembly of FIG. 5 in the open state.
Figure 11:
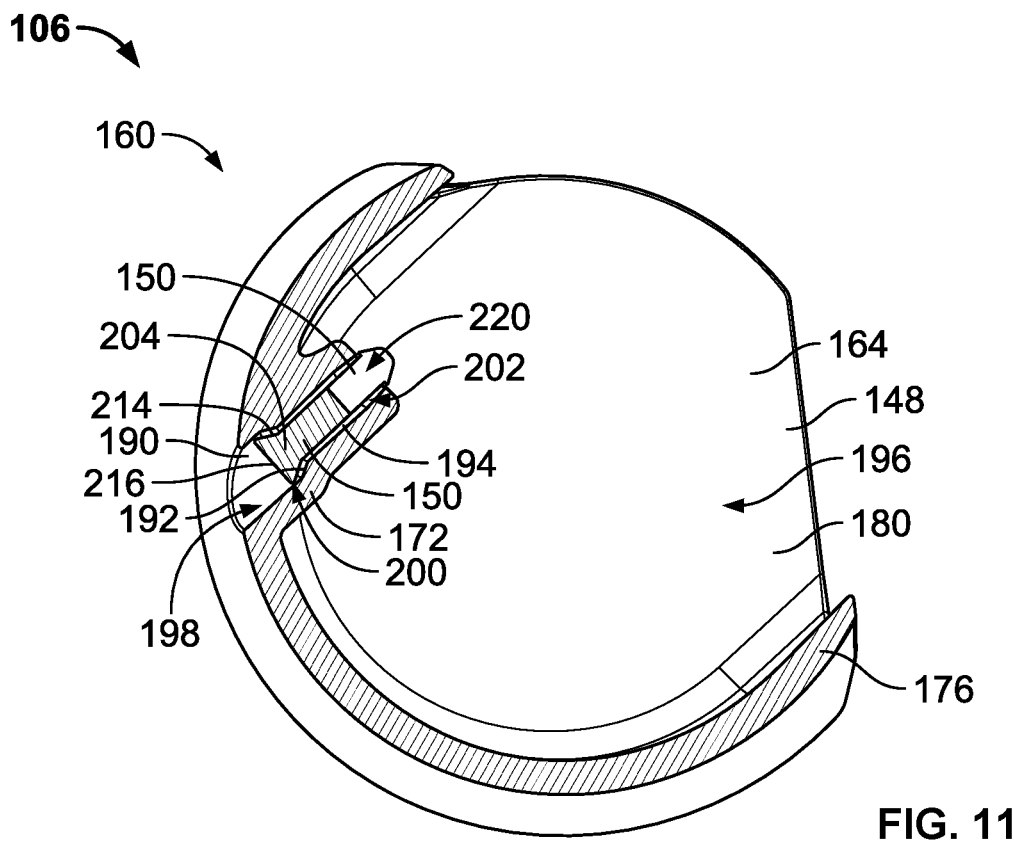
FIG. 11 is a cross-sectional view of the bleeder assembly of FIG. 5 taken along line 11-11 of FIG. 9.

With reference to FIGS. 8 and 11, the deaeration pin 150 is slidably engaged with the seat 172 or slidably disposed in the bleed passage 198. For example, the deaeration pin 150 slides in the bleed passage 198 to selectively close the bleed inlet 200. As such, the sealing head 204 is disposed adjacent to the first inner surface 190. The sealing head 204 interacts with the second inner surface 192 to prevent the deaeration pin 150 from sliding through the seat 172. With reference to FIGS. 7 and 10, the first barb 209 and the second barb 210 are sized and shaped to retain the deaeration pin 150 from sliding out of the seat 172.

With reference to FIGS. 7 and 8, when the bleeder assembly 106 is in the closed state 162, the sealing head 204 abuts the second inner surface 192. Thus, the sealing surface 214 sealingly engages or contacts the second inner surface 192 to close the bleed inlet 200 to the bleed passage 198, while the retention feature 208 is spaced apart from the seat 172.

With reference to FIGS. 10 and 11, when the bleeder assembly 106 is in the open state 160, the retention feature 208, including the first barb 209 and the second barb 210, contacts the seat 172. Thus, the sealing surface 214 is distanced or spaced apart from the second inner surface 192 to open the bleed inlet 200 to the bleed passage 198. When the bleeder assembly 106 is in the open state 160, the bleed inlet 200 is in fluid communication with the cavity 196 via the bleed outlet 202 and the valley 220.

Figure 19:
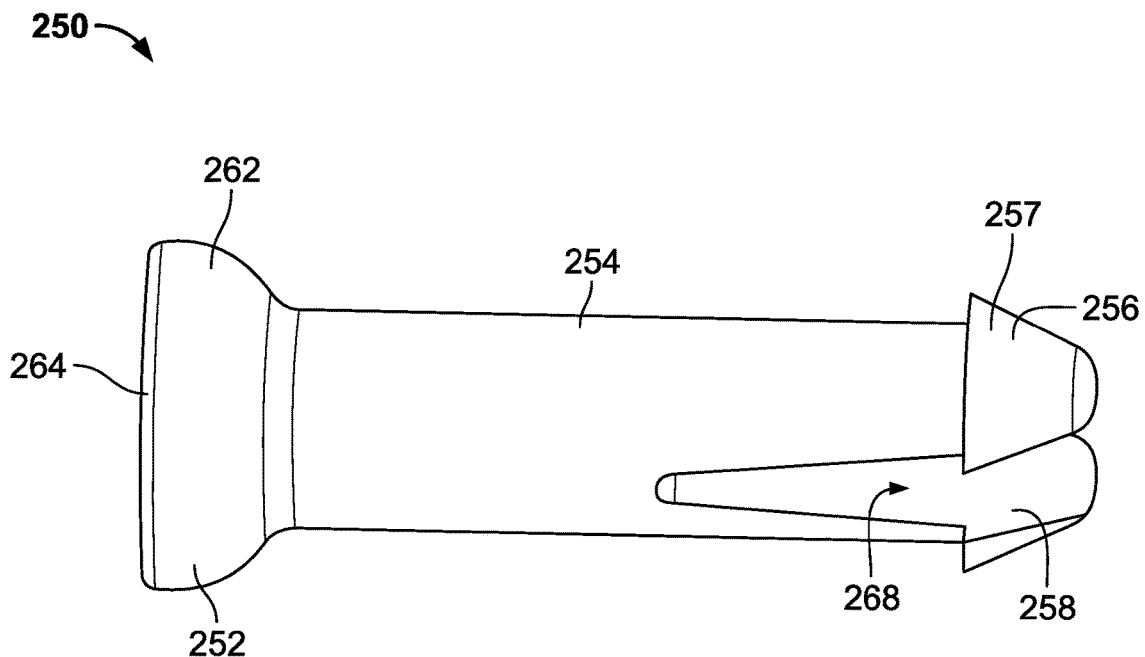
FIG. 19 is a side view of another embodiment of a deaeration pin.
Figure 20:
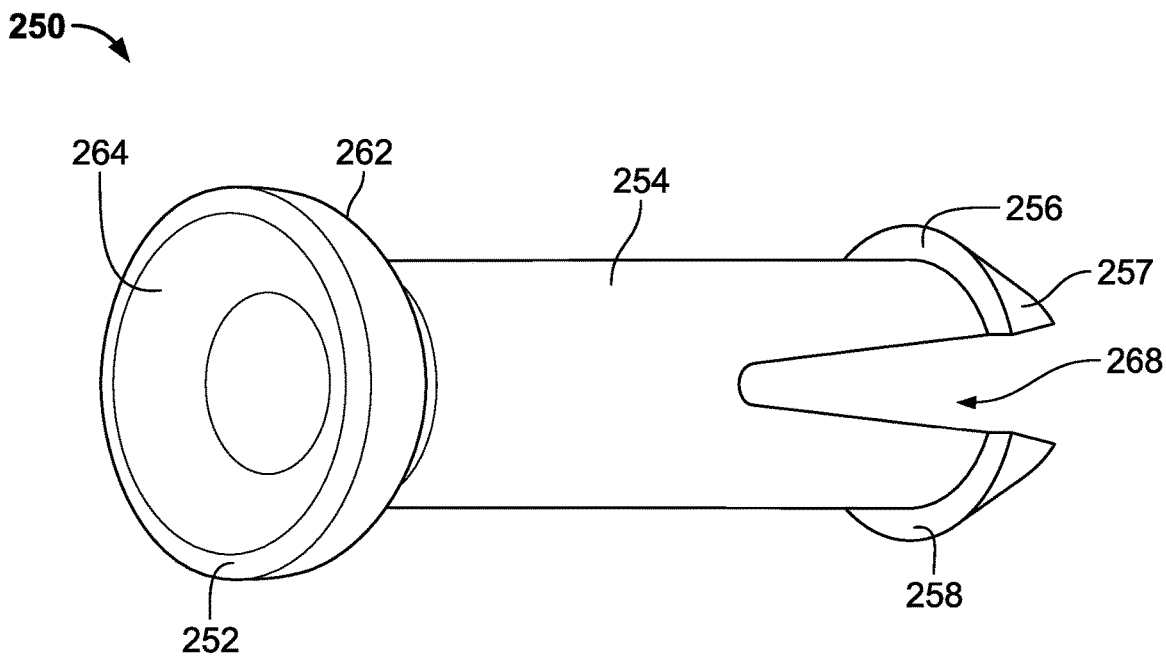
FIG. 20 is an isometric view of the deaeration pin of FIG. 19.

With reference to FIGS. 19 and 20, a second example deaeration pin 250 has a sealing head 252, a shaft 254, and a retention feature 256. In some embodiments, the retention feature 256 includes a first barb 257 and a second barb 258. The sealing head 252 has a sealing surface 262, and an end surface 264. The sealing surface 262 gradually narrows in diameter. In some embodiments, the sealing surface 262 is partially hemispherical. In other embodiments, the sealing surface 262 is coved. In still other embodiments, the sealing surface 262 is partially conical. The end surface 264 is concave. In this example, the first barb 257 and the second barb 258 define a valley 268 therebetween, such that the valley 268 extends partially along the shaft 254 toward the sealing head 252. The second example deaeration pin 250 is configured to operate with the ball 148 in the same manner as the first example deaeration pin 150.

In other embodiments, the shaft 206 of the deaeration pin 150 may be tapered in diameter, such that a diameter nearest to the sealing head 204 is smaller than a diameter farthest from the sealing head 204, thereby providing for press-fit retention within the seat 172. In still other embodiments, the retention feature 208 may be a snap-fit feature, such as a cylindrical flange, a plurality of slotted flange sections, a grommet, a bushing, an elastic or composite material, or some combination thereof, to provide for a snap-fit with the seat 172 in a closed position. It is further contemplated that the deaeration pin 150 may be provided without the valley 220.

With reference to FIG. 1, a cooling system of a vehicle (not shown) may include the deaeration valve 100. The cooling system may also include an engine, a radiator, a reservoir, and a pump (not shown).

With reference to FIG. 1, in operation, the pump draws coolant through the deaeration valve 100 via the coolant outlet 158 and discharges coolant into the engine. When the coolant passes through the engine, the engine transmits heat to the coolant, cooling the engine. The coolant may then pass through the radiator, where the coolant transmits heat to the surrounding environment, cooling the coolant. Additionally, when the coolant is warmed by the engine, the coolant may expand into the reservoir.

With reference to FIG. 1, in operation, when the engine is below a temperature range (e.g., an engine warm-up range), the ball 148 closes the first coolant inlet 152 and the second coolant inlet 154, e.g., the sealing wall 176 interacts with the ball seal 136, and opens the bypass inlet 120. In operation, when the engine is within the temperature range, the ball 148 rotates in the housing 108 to partially open the first coolant inlet 152, the second coolant inlet 154, and the bypass inlet 120. In operation, when the engine is above the temperature range, the ball 148 opens the first coolant inlet 152 and the second coolant inlet 154 and closes the bypass inlet 120.

When the cooling system is serviced, one or more connections in the cooling system may be opened. Thus, air may be introduced into the cooling system. When the cooling system is reassembled after service, the air may be trapped in the cooling system. Because the air is less dense than coolant, the air rises in bubbles formed through the cooling system. As the air rises, the air may encounter the ball 148, which closes the first coolant inlet 152 and the second coolant inlet 154 when the engine is below the temperature range. In operation, when the pump is off (e.g., not pressurizing the cooling system) the deaeration pin 150 (shown in FIG. 11) slidably falls via gravity in the ball 148 to the open position 160 (shown in FIG. 11). The air may thus rise past the ball 148 via the bleed passage 198 and into the cavity 196. The air may then further rise out of the deaeration valve 100 to escape into the atmosphere. Additionally in operation, when the pump is on (e.g., pressurizing the cooling system), the fluid pressure of the coolant acts on the end surface 216 (shown in FIG. 12) to slidably push the deaeration pin 150 in the ball 148 to the closed position 162 (shown in FIG. 12).

From the foregoing, it will be appreciated that the above example deaeration valve 100 includes a deaeration pin slidably disposed in a bleed passage defined in a ball. Because the deaeration pin is slidably disposed in the bleed passage, the deaeration valve 100 may allow air trapped in a coolant system (e.g., of a vehicle) to escape, which may prevent damage to and/or replacement of further components of the coolant system (e.g., a pump). Thus, the above-disclosed example deaeration valve 100 conserves resources as compared to existing coolant valves.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

The invention claimed is:

1. A valve, comprising:
a housing; and
a ball in fluid communication with the housing, the ball comprising a body, a seat defining a bleed passage therein, and a deaeration pin slidably disposed within the bleed passage,
wherein the deaeration pin includes a retention feature comprising a first barb and a second barb configured to retain the deaeration pin in the bleed passage.

2. The valve of claim 1, wherein the deaeration pin includes a head and a shaft positioned between the head and the retention feature.

3. The valve of claim 2, wherein the head of the deaeration pin defines a flat end surface.

4. The valve of claim 2, wherein the head of the deaeration pin defines a concave end surface.

5. The valve of claim 1, wherein the retention feature includes a valley positioned between the first and second barbs and partially extending along a shaft.

6. The valve of claim 2, wherein the bleed passage includes a first section having a greater diameter than a third section, and a second section having a gradually narrowing diameter between the first section and the third section.

7. The valve of claim 6, wherein the head further defines a sealing surface that is spaced apart from the second section when the deaeration pin is in an open position.

8. The valve of claim 6, wherein the retention feature is spaced apart from the seat when the deaeration pin is in a closed position.

9. A valve, comprising:
a housing;
a ball rotatably positioned within the housing, the ball including a body that includes a seat protruding inwardly from the body into a cavity, the seat defining a bleed passage therein; and
a deaeration pin selectively positioned between a closed position and an open position within the bleed passage,
wherein the deaeration pin includes a retention feature comprising a first barb and a second barb configured to retain the deaeration pin in the bleed passage.

10. The valve of claim 9, wherein the deaeration pin includes a head, a sealing surface, and a shaft.

11. The valve of claim 10, wherein the deaeration pin slides within the bleed passage to selectively open or close a bleed inlet.

12. The valve of claim 11, wherein the seat defines a first inner surface, a second inner surface that gradually narrows in diameter, and a third inner surface having a diameter that is smaller than a diameter of the first inner surface.

13. The valve of claim 12, wherein the sealing surface contacts the second inner surface in a closed position.

14. The valve of claim 12, wherein the retention feature contacts the seat in an open position.

15. The valve of claim 9, wherein the retention feature includes a valley that is positioned between the first and second barbs.

16. The valve of claim 10, wherein the sealing surface gradually narrows in diameter.

17. The valve of claim 10, wherein the sealing surface is coved.

18. The valve of claim 14, wherein the deaeration pin slides into an open position by a gravitational force.

19. The valve of claim 14, wherein the deaeration pin slides into a closed position by a pumping force.

20. A valve, comprising:
a housing defining an inlet and an outlet; and
a ball in fluid communication with the inlet and the outlet, the ball comprising a body, a pivot post, a seat defining a bleed passage, and a deaeration pin slidably disposed within the bleed passage,
wherein the deaeration pin includes a head attached to a shaft and a retention feature attached to the shaft, the head defining a sealing surface thereon,
wherein the retention feature comprises a first barb and a second barb configured to retain the deaeration pin in the bleed passage,
wherein the seat includes a first inner surface, a second inner surface, and a third inner surface, the first inner surface having a greater diameter than a diameter of the third inner surface, and the second inner surface having a gradually narrowing diameter between the first inner surface and the third inner surface,
wherein the head of the deaeration pin is disposed within the first inner surface and the sealing surface of the deaeration pin is configured to engage the second inner surface in a closed position; and
wherein the retention feature of the deaeration pin is configured to engage the seat in an open position.

\* \* \* \* \*